| United States Patent [19]
Blackmore

[11] Patent Number: 4,786,438
[45] Date of Patent: Nov. 22, 1988

[54] LIGNOSULFONATE/UREA BINDER FOR PARTICULATE COMPOSITES

[75] Inventor: Kenneth A. E. Blackmore, Bellingham, Wash.

[73] Assignee: Georgia-Pacific Corporation, Atlanta, Ga.

[21] Appl. No.: 85,848

[22] Filed: Aug. 10, 1987

Related U.S. Application Data

[62] Division of Ser. No. 472,881, Mar. 8, 1983, Pat. No. 4,704,230.

[51] Int. Cl.$^4$ .............................................. H01B 1/06
[52] U.S. Cl. ...................................... 252/510; 252/502; 252/512; 252/516; 252/518; 273/88; 273/93

[58] Field of Search ............... 252/502, 510, 511, 512, 252/516, 518; 373/88, 93; 264/105, 104, 128; 428/505; 419/411; 564/3

[56] References Cited

U.S. PATENT DOCUMENTS 3,725,019  4/1973  Blackmore .............................. 71/28
4,587,358  5/1986  Blouin ..................................... 564/3

Primary Examiner—Josephine Barr
Attorney, Agent, or Firm—Banner, Birch, McKie & Beckett

[57]  ABSTRACT

A coherent particulate composite is formed by blending particulate material with a binder containing lignosulfonate and urea.

4 Claims, No Drawings

LIGNOSULFONATE/UREA BINDER FOR PARTICULATE COMPOSITES

This application is a division of application Ser. No. 472,881, filed Mar. 8, 1983, now U.S. Pat. No. 4,704,230.

BACKGROUND OF THE INVENTION

1. Field of the Invention

The present invention pertains to a new process for forming coherent particulate composites, as well as to the composite itself. This invention particularly relates to a molding pelletizing or extrusion process for forming high strength particulate composites using a urea-lignosulfonate binder. Such composites are useful, for example, for forming carbon electrodes used, inter alia, in aluminum refining 2. Description of the Prior Art In the standard procedure for preparing carbon electrodes, a mixture of powdered petroleum coke, powdered metallurgical coke and binder is molded at an elevated temperature into the desired shape. Coal tar pitch, i.e., the residue of coke over tar distillation, is generally used as the binder. The so-formed electrode is then "fired" by heating in a relatively inert atmosphere, e.g., under a nitrogen purge, at a temperature generally above about 1000° C. Such heating pyrolyzes the binder and gives the electrode a permanent form, with high mechanical strength and thermal conductivity and low electrical resistance.

Because of the immense size of electric furnace electrodes, diameters typically range between 14–57 inches with lengths between 5–15 feet, it is critical that the molded "green" electrode have sufficient strength to withstand the rigors of subsequent handling and processing. This is particularly important since each electrode requires a great deal of time and expense to produce. Electrode rejectsand failures are very costly.

It is an object of the present invention to provide a new binder that can be used, for example, in forming furnace electrodes. Electrodes produced using this new binder exhibit much improved "green" strength. A key component in this new binder is the lignin derivative lignosulfonate.

Besides cellulose, lignin is the principal constituent of the woody structure of higher plants. Lignin acts as a cementing agent in plants binding cellulose fibers together in a rigid structure. Commercially, lignin is available in the form of lignosulfonates and has been used in the prior art as a binder, filler and resin extender. The primary source of lignosulfonates is the pulp industry.

Woddrop U.S. Pat. No. 1,221,259; Tanberg U.S. Pat. No. 2,495,148; Seymour U.S. Pat. No. 3,635,684; and Blackmore U.S. Pat. No. 3,725,029 all disclose using lignosulfonates as at least one component of a binder composition in forming particulate composites. In Woddrop, for example, a binder composition including lignosulfonate powder, powdered hard coal tar pitch and fine powdered coal is disclosed. The binder is blended with a granular material, e.g., sand, to form a mixture which is then moistened, molded and dried at an elevated temperature, e.g., 350° F., to form a composite. The composite can be used, for example, as a mold in forming metal castings.

In Tanberg, a carbon electrode is formed by blending, molding and drying a mixture of crushed anthracite coal or coke and a minor fraction (i.e., 10–35% by weight) of a concentrated aqueous solution of lignosulfonate. Tanberg notes that the binder can be carbonized at a relatively low temperature, i.e., 200°–300° C., making it an ideal binder for the continuous process for preparing electrodes.

In Seymour, a composite fuel log is formed by blending and molding a mixture of ground corn cobs, including husk material, paraffin wax, liquid lignosulfonate and starch.

Finally, in Blackmore a composite ammonium sulfate fertilizer suitable for dry blending with other particulate fertilizers is formed by blending powdered ammonium sulfate with a concentrated aqueous solution of lignosulfonates. The ammonium sulfate is heated (90° to 120° C.), granulated with the concentrated lignosulfonate binder and cooled. The ammonium sulfate granules can then be provided with a urea coating.

It is an object of this invention to provide an improved process for binding particulate materials into coherent composites.

It is also an object of this invention to provide a high strength composite formed by binding particulate materials with a lignosulfonate-containing binder.

It is another object of this invention to provide a urea-lignosulfonate binder composition useful for forming high strength particulate composites.

It is a further object of this invention to provide a process for forming high strength particulate composites useful as carbon electrodes.

Other objects and advantages of this invention will become apparent from the following disclosure.

SUMMARY OF THE INVENTION

In one aspect, the present invention broadly comprises a new process for forming coherent particulate composites. According to this invention, heated particulate material is blended with a minor amount of a urea-lignosulfonate binder composition, molded at an elevated temperature and cooled. In particular the present invention provides a process for forming coherent particulate composites comprising:

(a) blending a particulate material with between about 2–20% by weight urea solids and with between about 2–20% by weight lignosulfonate solids, said urea and lignosulfonate being provided in approximately equal parts by weight;

(b) maintaining the particulate material at a temperature to maintain said urea and lignosulfonate in liquid form during said blending to form a uniform mixture; and (c) forming said mixture into a composite of desired shape, size and density.

In another aspect, the present invention relates to the composite formed by blending, forming and cooling a mixture of heated particulate material and a urea-lignosulfonate binder composition. In particular, this invention provides a coherent particulate composite comprising a uniform mixture of particulate material and 5–30% by weight of a binder, said binder comprising substantially equal parts by weight of urea solids and of lignosulfonate solids. In the composite, particulate material is cohesively joined together by a substantially uniform matrix of urea and lignosulfonate.

In still another aspect, the present invention relates to the urea-lignosulfonate binder composition formed by blending together approximately equal parts by weight urea and lignosulfonate. The binder composition can be formed in situ, that is during the formation of the composite itself, or the binder components can be premixed, for example in dry powder form, for subsequent blending with heated particulate material.

DETAILED DESCRIPTION OF THE INVENTION

The present invention pertains to an improved process for forming coherent particulate composites using a urea-lignosulfonate binder. Depending upon the application, a wide variety of particulate materials can be formed into composites using the present invention, including, for example, powdered coal and coke, sand, silicon carbide, alumina, metal and metal oxide powder and the like. The only limitation on the choice of particulate material suitable for forming a composite according to this invention is that the material must be stable at the elevated temperature needed to fuse the binder. In other words, the particulate material must not undergo a phase change, chemically decompose, or become highly reactive at the temperatures needed to melt the binder. The particle size of the particulate material employed is not critical, although the strength of the composite will generally be influenced to some degree by the size distribution of the particulate material. For example, smaller sized particulates generally yield higher strength composites; while larger sized particulates yield lower strength composites. Generally, particulate material of 20 to 100 mesh size (U.S. Sieve Series) is generally used. As will be recognized by one skilled in this art, however, other sizes are possible, the size of the particulate material being fixed principally by the end use and desired strength of the composite.

The lignosulfonate used in the binder composition of this invention is obtained by sulfonating lignin obtained from cellulosic materials. Any of the various sulfonating procedures known in the art can be used. Probably the largest commercial source of lignosulfonates is the spent sulfite liquor from the paper and pulp industry where lignocellulosic materials such as wood chips, sawdust, straw, etc. are digested under pressure with a bisulfite or sulfite salt, e.g., calcium, magnesium, sodium, or ammonium bisulfite, to separate the cellulose or pulp from the lignin. In this process, lignin is sulfonated and dissolves in the digestion liquid. The sulfite process results in a spent liquor that contains 40 to 55 percent of the original wood. The spent liquor generally contains many other constituents besides the sulfonated lignin. These other materials may be removed, but generally the liquors are used without further processing or treatment other than mild alkaline, heat or acid treatments. In particular, it may be desirable to have low molecular weight lignosulfonates and some carbohydrates remain in the recovered lignosulfonate powder since these materials have a plasticizing effect upon the lignosulfonates, improving their adhesive and film forming properties. The lignosulfonates are typically recovered as a light tan to dark brown powder from the spent liquor by evaporating excess water. This powder is stable in dry form.

A variety of different metal salts of lignosulfonates can be used in the practice of this invention. Such salts can include, for example, calcium, magnesium, sodium, potassium, aluminum, iron or the like.

The urea and lignosulfonate of this invention can be employed in the substantially anhydrous (i.e. dry) form or can be employed with a solvent such as water, ethanol or the like. The ingredients can be premixed with the solvent or the solvent can be added after the dry ingredients and particulate material have been mixed. If a solvent is employed the process can be carried out at ambient temperatures. In view of possible handling problems and the possible need to remove solvent during the forming operation, the use of a substantially anhydrous binder is generally preferred and the practice of this invention will be described with respect thereto.

In a preferred procedure for forming the composite according to this invention employing dry urea and lignosulfonate, particulate material is initially heated to a temperature above the melting point of the binder, i.e., above about 132° C. Preferably, the particulate material is heated to about 150° C. Urea is then added to the hot particulate material and the molten urea is blended uniformly therewith. Urea from any available source can be employed. The urea may be added as a dry powder or in molten form. When the urea is added as a dry solid, the particulate material is preferably at a high enough temperature to ensure that the urea rapidly and uniformly melts. In any even, however, the particulate material must not be heated to an elevated temperature that would cause excessive thermal decomposition of the urea. Typically, the particulate material is heated to about 140° C.–160° C. After the molten urea has been uniformly blended with the particulate material, dry lignosulfonate powder is added to the mixture. The lignosulfonate dissolves into the urea and is dispersed substantially uniformly throughout the mixture.

Thereafter, the mixture of particulate material and binder is formed into a composite of the desired shape, size and density and is cooled to yield a coherent particulate composite. In an alternate dry procedure, the dry lignosulfonate can be blended with the particulate material before adding the urea. The lignosulfonate powder can be mixed with the particulate material either before or after heating. In still another dry procedure, the dry urea and dry lignosulfonate powder can be pre-mixed under ambient conditions and this mixture is then mixed with hot particulate material. The hot mixture is then formed into the composite, preferably while maintaining the mixture at the elevated temperature, and the so-formed composite is thereafter cooled. Composites formed in this manner have exhibited excellent strengths.

On a weight basis, the urea-lignosulfonate binder constitutes a minor amount of the composite and generally comprises between about 4 and 40 percent of the composite. Preferably, the binder comprises between about 5 and 30 percent of the composite. The proportions of binder and particulate material can be varied to give a composite with desired physical characteristics such as density and strength. If less than 4 percent by weight binder is used in forming the composite, the strength of the composite is generally less than desired. On the other hand, using more than 40 percent binder in the composite is generally not economically justified since composite strengths are not significantly improved and in some cases may actually decrease at higher amounts of binder. As noted above, the binder preferably comprises between about 5 and 30% of the composite. Most preferably, the binder comprises between about 7 and 20% of the composite.

The binder composition of this invention is prepared by combining approximately equal parts by weight urea and lignosulfonate. As used throughout the specification and claims, the phrase "approximately equal parts by weight" means that there is no more than about 50 percent excess of one component relative to the other component in the binder composition. Preferably, no more than about 25 percent excess of one component relative to the other component is used. Most preferably, the binder composition comprises substantially equal weights of urea and lignosulfonate. As noted above, the binder composition can be formed in situ or lignosulfonate can be mixed with urea, and the resultant mixture, constituting the binder powder can be subsequently blended with hot particulate material, molded and cooled to form the desired composite.

The coherent particulate composites of this invention are typically formed by pressing, extruding or molding the mixture of particulate material and binder into a composite of the desired shape, size and density. The composite is preferably freed of all voids during the forming step. Forming pressures above about 1000 psi are typical. Generally, pressures between about 400 and 8000 psi will be used depending upon the composite's ultimate use. Preferably, the pressing, extruding or molding chamber is also pre-heated so that the composite forming step takes place at substantially the same temperature at which the particulate material-binder mixture is initially formed.

A wide variety of commercial molding, extruding or pelletizing equipment can advantageously be used in this process. For example, pelletizing machines wherein the pelletization pressure is formed between opposing contoured platens or between the nip of two oppositely rotating wheel-like members can be used. Additionally, plunger-driven pelletizing machines wherein the pellet-forming pressure is formed in an elongated barrel or screw fed extrusion machines wherein extrusion pressures are developed by a tapered barrel and outlet die can also be employed.

The following examples are included for illustrative purposes only and are not intended to limit the scope of the invention.

EXAMPLE 1

This example describes a procedure used to prepare carbon pellets, having strength characteristics suitable for use as carbon electrodes. Forty-two grams of particulate petroleum coke, having a particulate size of minus 8 mesh (Tyler) were blended with 4g of aluminum lignosulfonate powder and 4g of urea in a mixing vessel heated to about 150° C. The ingredients were blended for about 1.5 minutes. The mixture was then transferred to a 2.25 inch diameter pellet press, preheated to about 160° C. A "green" pellet was then formed using a molding pressure of about 4,200 psi for about 1.5 minutes. "Green" pellets were fired by heating in a nitrogen-purged furnace to 1000° C. in about 3 hours, holding the pellets at this temperature for an additional 15 minutes and then gradually cooling the pellets over an hour.

The "green" strength of the pellets produced using this invention was 5934 psi. This compares with a typical "green" strength and of 3864 psi for carbon electrodes produced by the standard process using the same amount of pitch binder. It should also be noted that the standard composite crumbled under the destructive testing while the composite of this invention simply deformed and cracked while remaining essentially in one piece.

EXAMPLE 2

This example describes the preparation and testing of composites produced using powdered coal. The procedure for preparing pellets of the coal powder was substantially the same as described in Example 1, except that the pellets were not "fired". Pellets were prepared at three different binder contents and were tested for their compressive strengths using the Example 1 procedure. Table I presents the results.

TABLE I

| Binder (%) | Compressive Strength (psi) |
|---|---|
| 5.0 | 400 |
| 7.5 | 3,600 |
| 10.0 | 3,800 |

The results illustrated that the proportion of binder has a critical effect on the compressive strength of the composite.

EXAMPLE 3

Eighty-five grams of refractory sand was mixed with 2.25 grams powdered urea, 2.25 sodium lignosulfonate and 3.0 grams of water. A second sample was prepared in which the binder formula was pre-dissolved in the water.

After thorough mixing the sand and binder mixture was formed in a ring mold. The sand-binder composition was free-standing when the mold was removed. After baking at 400° F. for 30 minutes the sand core remained structurally sound.

While preferred embodiments of this invention have been discussed herein, those skilled in the art will appreciate that changes and modifications may be made without departing from the spirit and scope of this invention, as defined in and limited by the scope of the appended claims.

I claim:
1. A coherent particulate composite comprising a uniform mixture of particulate material and 5-30% by weight of a binder, said binder comprising approximately equal parts by weight of urea solids and lignosulfonate solids.
2. The composite of claim 1 wherein the particulate material is powdered coal.
3. The composite of claim 1 wherein the particulate material is powdered coke.
4. The composite of claim 1 containing 7-20% by weight of said binder.

* * * * *